United States Patent [19]

Derman

[11] Patent Number: 4,862,716

[45] Date of Patent: Sep. 5, 1989

[54] STUD NOT LOCKING DEVICE FOR SPARE TIRES

[76] Inventor: Jay S. Derman, 1201 N. Catalina Ave., P.O. Box 949, Redondo Beach, Calif. 90277

[21] Appl. No.: 255,981

[22] Filed: Oct. 11, 1988

[51] Int. Cl.$^4$ .................... B65D 55/14; F16B 41/00
[52] U.S. Cl. ........................ 70/166; 70/229; 70/232; 70/259
[58] Field of Search .......... 70/163, 166–168, 70/229–232, 259, 260; 411/965, 971, 976, 87, 90

[56] References Cited

U.S. PATENT DOCUMENTS

| | | | |
|---|---|---|---|
| 1,208,236 | 12/1916 | Thompson | 70/230 |
| 1,434,492 | 11/1922 | Johnson | 70/120 X |
| 1,554,958 | 9/1925 | Falk | 70/232 X |
| 1,599,314 | 9/1926 | Best | 70/229 X |
| 1,629,015 | 5/1927 | Axelson | 70/232 X |
| 1,796,517 | 3/1931 | Ganz | 70/232 X |
| 1,799,593 | 4/1931 | Lavender | 70/260 |
| 1,818,373 | 8/1931 | Beach | 70/232 X |
| 1,881,866 | 10/1932 | Neuls | 70/232 |
| 2,315,245 | 3/1943 | Collier | 70/259 X |
| 2,800,601 | 7/1957 | Martin et al. | 70/232 |
| 3,423,971 | 1/1969 | Beunelli | 70/168 X |
| 3,818,731 | 6/1974 | Waling et al. | 70/232 |
| 4,779,434 | 10/1988 | Derman | 70/163 X |

Primary Examiner—Gary L. Smith
Assistant Examiner—Suzanne L. Dino
Attorney, Agent, or Firm—Monty Koslover Assoc.

[57] ABSTRACT

A device for locking a spare tire wheel which is mounted vertically on the back of a vehicle. The spare is mounted on studs that project from the back of the vehicle and is fastened in place with stud nuts. The device comprises three major metal parts: One part is a rectangular section tube that fits over one of the studs, with the stud protruding up through it. Another part is a locking assembly shaped to hold the stud nut in place. This assembly is inserted in the tube until it grasps the stud nut. The third part is a cylindrical lock plug which is inserted through a hole in the top of the tube and also through a hole in the locking assembly. Turning a key in the lock plug releases a lock pin that prevents removal of the lock plug. The stud nut can not now be accessed for removal, and the spare tire wheel is prevented from being removed by unauthorized persons.

3 Claims, 2 Drawing Sheets

STUD NUT LOCKING DEVICE FOR SPARE TIRES

BACKGROUND OF THE INVENTION

In recent years, an increasing number of manufacturers of popular small pickup trucks and similar vehicles have mounted the spare tire vertically on the back of the vehicle. The spare is mounted on three or more studs that project from the back of the vehicle, and is fastened in place with stud nuts.

To prevent theft of the spare tire, various means are used, the most prevalent being replacement of one of the stud nuts with a special locking nut. This special locking nut requires a key to operate it and is usually effective in preventing unauthorized removal of the spare. However, someone using a heavy wrench or cutters may succeed in twisting off the locking nut to remove the spare tire. To augment the special locking nut, some owners add chains and a padlock to hold the spare tire firm to its mounting. These can be defeated by a determined thief armed with heavy cutters. Thus, there is a need for a locking device that can not be easily tampered with or defeated.

SUMMARY OF THE INVENTION

The invention comprises three major metal steel parts or assemblies. These are: a tube assembly, a locking fork assembly, and a lock plug. In use, one end of the tube assembly is placed over one of the wheel mounting studs that protrudes through a hole in the hub of the spare tire. The regular stud nut is then fastened to the stud and tightened. After this, the locking fork assembly is inserted in the tube assembly and pushed through until its fork end holds the stud nut securely. The lock plug is then inserted through a hole in the top of the tube assembly and through an alignment tube hole in the locking fork assembly, preventing the locking fork assembly from moving. Turning a key in the cylindrical lock of the lock plug, releases a lock pin that prevents removal of the lock plug. The configuration is now arranged so that there is no access to the bearing surfaces of the stud nut, preventing the use of a box wrench or any other kind of a wrench to loosen the nut. The stud itself is not accessible. To prevent rotation of the device, a boss is raised on the bottom of one end of the tube assembly. This boss interferes with the rim of the hub if the device is rotated. The device is made of steel parts of a size and thickness not generally susceptible to easy cutting, bending or breaking.

Accordingly, it is a principal object of this invention to provide a device that will securely lock a spare tire wheel in place and prevent its unauthorized removal.

Another object is to provide an easily assembled device. Yet another object is to provide a locking device that can not be easily tampered with.

Further objects and advantages of the present invention will become apparent from the study of the following portion of the specification, the claims and the attached drawings.

DESCRIPTION 0 THE PREFERRED EMBODIMENT

Figure 1:
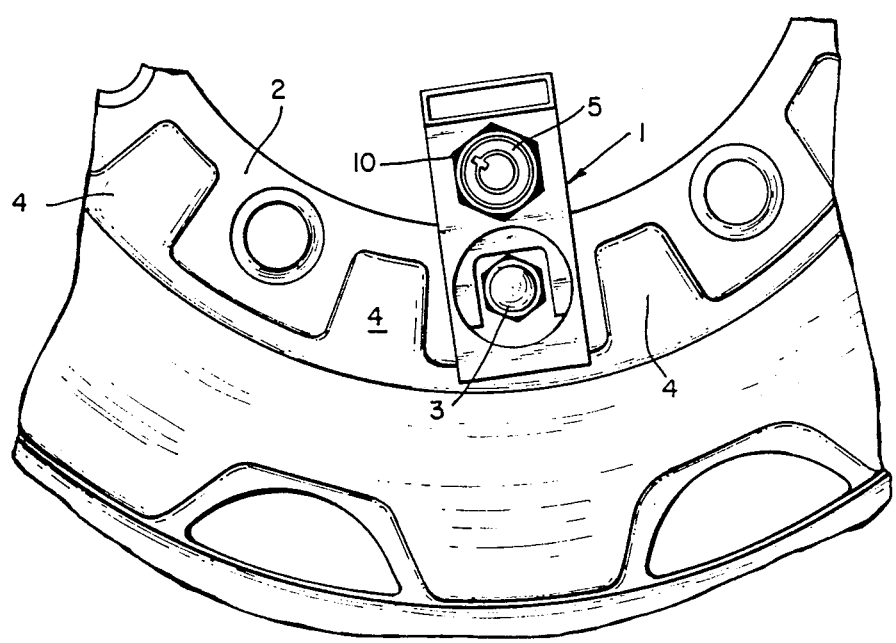
FIG. 1 is a partial plan view of the hub of a spare tire, showing the present invention in place and locking the spare tire to the back of the vehicle.

Referring particularly to the drawings, there is shown in FIG. 1 a preferred embodiment of the stud nut locking device 1 in place, locking the spare tire 2 in position on the back of the vehicle. The stud nut 3 is prevented from being rotated off by the clamping action of the locking fork assembly that is located inside the rectangular tube, and which can be seen partially through the top clearance hole. The locking fork assembly, in turn is fixed in position by the lock plug 5 which is locked by a key. Raised projections 4 on the wheel hub 2 act to prevent substantial rotation of the stud nut locking device 1. In addition, a raised boss on the lower surface of the tube (not shown in FIG. 1) interferes with the inside rim of the hub 2 if an attempt is made to rotate the device. The device is shaped and sized to fit between the hub projections 4 with its end fitting against the well wall of the hub 2.

Figure 2:
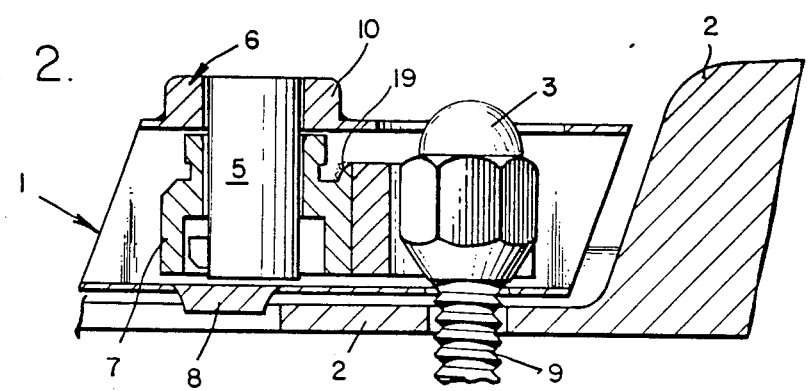
FIG. 2 is a side elevation cross-section view of the present invention locked in place, and showing also a partial cross-section of the spare tire hub and a mounting
Figure 3:
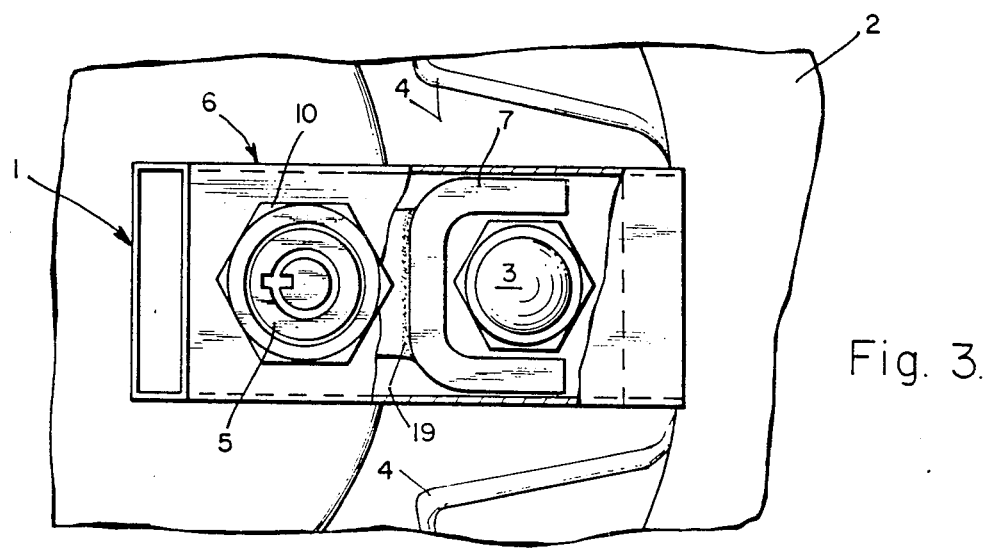
FIG. 3 is a top view of the device, locked in place and having a portion of the device cut away to show the clamping action of the device holding the stud nut.

Referring now to FIGS. 2 and 3, the illustration of the device is enlarged to approximately full size, showing the locking and clamping action. In FIG. 2, a side elevation cross-section view of the device is given, taken along its longitudinal axis. Here the device is shown to comprise a tube assembly 6, a locking fork assembly 7 and a lock plug 5. The stud nut 3 is shown screwed on in place on one of the support studs 9. The upper boss 10 welded to the top of tube assembly 6 serves to house the lock plug 5, while the lower boss 8 is a steel disk about 0.125 in. thick, welded to the bottom of the tube assembly 6 and bearing against the inside rim of the wheel hub 2. The upper boss 10 together with the locking fork assembly 7 protects the lock plug 5 so that only its key face is accessible, providing added security. It should be noted that both ends of the device 1 as depicted in FIG. 2, are angled to fit the approximate slope of the wall of the wheel hub. This angle allows close fitting to the wheel hub, further inhibiting movement of the device. In FIG. 2, the locking fork assembly 7 is shown in position inside the assembly 6 engaging the stud nut 3. The top surface of the locking fork assembly 7 is made the same height as the top edge of the stud nut 3 to prevent access to the nut facing edges by a wrench. In FIG. 3, part of the tube assembly is shown cut away to clearly show the clamping action of the locking fork assembly 7.

Figure 4A:
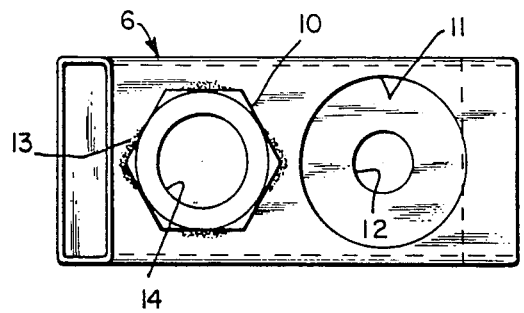
FIGS. 4A, 4B and 4C are respectively, a plan view, a side elevation view and an end elevation view of a first preferred tube assembly.
Figure 4B:
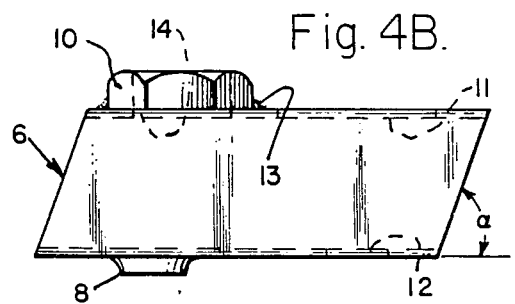
Figure 4C:
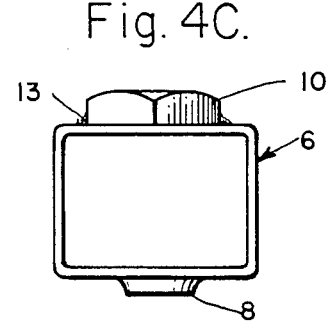

Referring again to the drawings, FIGS. 4A, 4B and 4C show a plan view, a side elevation view and an end elevation view of the first preferred tube assembly 6. The tube assembly comprises a rectangular tube body made of steel and the two bosses. The upper boss 10 and the lower boss 8 are both secured by welds 13 to the tube assembly 6. A wrench clearance hole 11 approximately 1.25 in. diameter to accommodate a lug nut wrench, is cut in the top surface of the tube assembly 6 and made concentric with a stud clearance hole 12 of approximately 0.50 in. diameter that is cut in the bottom surface of the assembly. The upper boss 10 has a clearance hole 14 cut in it and the rectangular tube body has a first hole cut in it coincident with the hole 14 in the upper boss. These holes in the upper boss and the tube body are for housing the lock plug. Both ends of the tube assembly 6 are cut or formed at an angle α of approximately 70 degrees to fit the slope of the wheel hub 2 wall. Both the rectangular tube body and bosses are massive and fabricated of steel, with a tube wall thickness of 0.050 in. or more. The preferred rectangular tube body has a cross section of 1.50 in. by 1.0 in. at its open ends and an overall length of approximately 3 in., in order to accommodate the locking fork assembly and also be able to fit in the well of the spare tire wheel hub 2. After the bosses are welded to the tube body the whole assembly is painted for corrosion protection.

Figure 5:
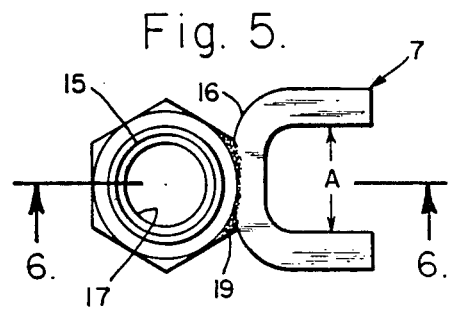
FIG. 5 is a plan view of the locking fork assembly.
Figure 6:
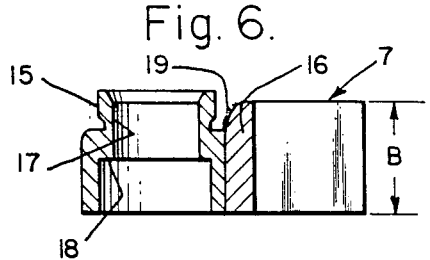
FIG. 6 is a side elevation cross-section view of the locking fork assembly taken along line 6—6 of FIG. 5.

Referring now to FIGS. 5 and 6, there are shown a plan view and a side elevation cross-section view of the locking fork assembly 7. The assembly comprises a nut-alignment tube 15 and a "U" clamp 16. When welded together, the nut-alignment tube 15 houses the lock plug 5 and the "U" clamp 16 engages the stud nut, preventing removal of the nut. An alignment tube hole 17 is bored in the nut-alignment tube 15 which is then stepped further in diameter 18 to accommodate the extended locking pin of lock plug 5. The diameter of alignment tube hole 17 is sized to fit the diameter of the lock plug 5 with clearance. Dimensions A and B are respectively 0.812 in. and 0.750 in. Dimension A fits the parallel face width of the standard stud nut with clearance. Dimension B is made equivalent to the height of the stud nut faces to prevent access to the stud nut by a wrench. Both nut-alignment tube 15 and "U" clamp 16 are made of thick steel. The locking fork assembly 7 may also, if economical, be made formed of one piece of metal, having the shape, size and holes described above.

Figure 7A:
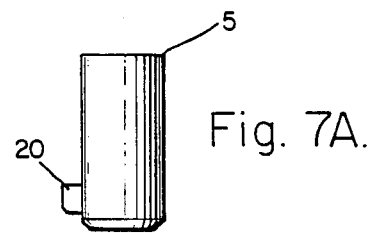
FIGS. 7A and 7B are respectively, a plan view and an end view of the lock plug showing its locking pin extended.
Figure 7B:
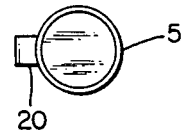

FIGS. 7A and 7B are respectively a plan view and end view of the lock plug 5 showing its locking pin 20 extended. The length of the cylindrical lock plug 5 is cut to fit the overall height of the inside of the tube assembly 6, so that it will fit inside without protruding over the top of the upper boss 10. The lock plug 5 is made of a chrome plated alloy metal.

Figure 8A:
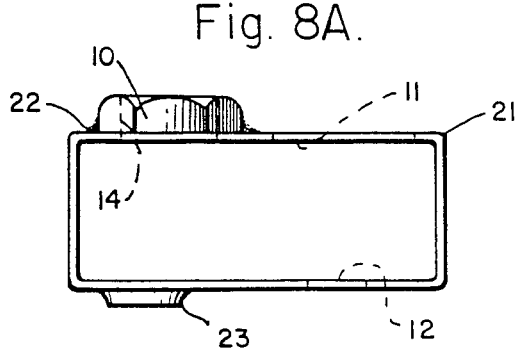
FIGS. 8A and 8B are respectively, a side elevation view and end elevation view of a second preferred tube assembly.
Figure 8B:
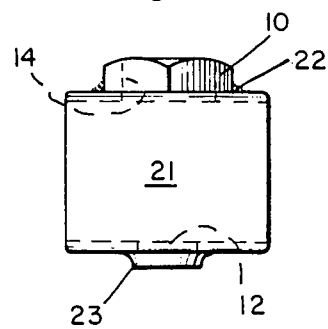

A second preferred tube assembly 21 is depicted in FIGS. 8A and 8B. In this alternate design, the rectangular tube walls are at the ends rather than along the longitudinal sides as is the case for the preferred tube assembly 6. The rectangular tube body has a cross section of 1.0 in. by approximately 3.0 in. and a width of 1.5 in. The open side of the tube for this configuration is at the long (3.0 in.) side. In this configuration, the locking fork assembly 7 would be inserted from the side rather than being slid in the end of the tube. Otherwise, there is no difference between the two tube assemblies. The wrench clearance hole 11 and stud clearance hole 12 are the same as described for tube assembly 6, as are upper boss 10 and lower boss 23. This alternate design tube assembly 21 is put forward for possible use in the device for occasions when the wheel hub 2 has no raised ridges 4 as shown in FIG. 1. Thus, clearance would be available for insertion of the locking fork assembly 7 through the side of tube assembly 21.

From the foregoing description, it is believed that the preferred embodiment achieves the objects of the present invention. Alternative embodiments and modifications of the embodiments described herein will be apparent to those skilled in the art. These and other alternatives are considered to be equivalent and within the spirit and scope of the present invention.

Having described the invention, what is claimed is:

1. A locking device for attachment to a support stud used to hold a spare tire vertically on the back of pickup trucks and similar vehicles, so that the stud nut is held within the device and prevented from being turned off the stud, thereby preventing the spare tire from being removed; said locking device being sized and shaped to fit radially on the spare tire wheel hub between the projections in the well of the spare tire wheel hub, said wheel hub typically having a well wall slope of approximately 70 degrees; said locking device utilizing any standard stud nut that fits the wheel support studs; said locking device comprising three metal sheet assemblies or parts: a tube assembly, a locking fork assembly and a cylindrical lock plug; said locking device being assembled so that said tube assembly is first placed over one of said wheel support studs and a stud nut is tightened to said stud, said locking fork assembly is then inserted in the end of said tube assembly until it grasps said stud nut and holds said stud nut from rotation, said cylindrical lock plug is inserted through a hole in the top of said tube assembly, locking said locking fork assembly in place; the configuration of said tube assembly being that its cross section is rectangular and open, and the tube is closed on all surfaces along its longitudinal axis; said tube assembly comprising a tube body fabricated of tube steel having a wall thickness of approximately 0.050 in. for strength, an upper boss welded to the top surface of said tube body at one end and having a hole bored in it to fit said lock plug, and a lower boss welded or formed to the bottom surface of said tube body located underneath said upper boss; said tube body having a longitudinal axis approximately 3 in. in length and cross section dimensions of 1.5 in. by 1.0 in. to accommodate said locking fork assembly, said tube body being cut angled at both ends at an angle 70 degrees to the longitudinal axis in order to fit the well wall slope of said spare tire wheel hub; said tube body having a wrench clearance hole approximately 1.25 in. diameter cut in its top surface and made concentric with a stud clearance hole approximately 0.50 in. diameter located on the bottom surface, both holes located at the distal end from the upper and lower bosses along the longitudinal axis of said tube body; said stud clearance hole being for the purpose of engaging said wheel support stud, and said wrench clearance hole being for the purpose of allowing tightening of said stud nut on to said wheel support stud using a vehicle equipped lug nut wrench; prior to its engagement by said locking fork assembly; said lock plug, when inserted in place and when its cylinder lock mechanism is rotated by a key, preventing the removal of said locking fork assembly, clamping said stud nut in place on said support stud and preventing its rotation, thereby preventing the spare tire wheel from being removed by unauthorized persons.

2. A locking device as set forth n claim 1 wherein: said locking fork assembly includes a nut alignment tube which has a first hole bored through it along its longitudinal axis, said first hole acting as an alignment tube hole, being sized to fit and hold said lock plug in place; said nut alignment tube further including a step in the diameter of said first hole which is enlarged to accommodate the extended locking pin of said lock plug, preventing said lock plug from being withdrawn when its cylinder lock mechanism is rotated by a key.

3. A locking device for attachment for a support stud used to hold a spare tire vertically on the back of pickup trucks and similar vehicles, so that the stud nut is held within the device and prevent from being turned off the stud, thereby preventing the spare tire from being removed; said locking device being sized and shaped to fit radially on the spare tire wheel hub for a wheel hub style having no projections in the well of the spare tire wheel hub, said wheel hub typically having a well wall slope of approximately 70 degrees; said locking device utilizing any standard stud nut that fits the wheel support studs; said locking device comprising three metal steel assemblies or parts: a tube assembly, a locking fork assembly and a cylindrical lock plug; said locking device being assembled so that said tube assembly is first placed over one of said wheel support studs and a stud nut is tightened to said stud, said locking fork assembly is then inserted in the side of said tube assembly to hold said stud nut from rotation and said cylindrical lock plug is inserted through a hole in the top of said tube assembly, locking said locking fork assembly in place; the configuration of said tube assembly being that its two longitudinal sides are open and its ends are closed to facilitate insertion of said locking fork assembly through its side; said tube assembly comprising a rectangular tube body fabricated of tube steel with a wall thickness of approximately 0.050 in. for strength, an upper boss welded to the top surface of said tube body at one end and having a hole bored in it to fit said lock plug, and a lower boss welded or formed to the bottom surface of said tube body located underneath said upper boss; said tube body having a longitudinal axis approximately 3 in. in length an cross section dimensions of 1.5 in. by 1.0 in. to accommodate said locking fork assembly; said tube body having a wrench clearance hole approximately 1.25 in. diameter cut in its top surface and made concentric with a stud clearance hole approximately 0.50 in. diameter located on the bottom surface, both holes located at the distal end from the upper and lower bosses along the longitudinal axis of said tube body; said stud clearance hole being for the purpose of engaging said wheel support stud, and said wrench clearance hole being for the purpose of allowing tightening of said stud nut on to said wheel support stud using a vehicle equipped lug nut wrench, prior to its engagement by said locking fork assembly; said lock plug, when inserted in place and when its cylinder lock mechanism is rotated by a key, preventing the removal of said locking fork assembly, clamping said stud nut in place on said support stud and preventing its rotation, thereby preventing the spare tire wheel from being removed by unauthorized persons.

* * * * *

UNITED STATES PATENT AND TRADEMARK OFFICE
CERTIFICATE OF CORRECTION

PATENT NO.   : 4,862,716

DATED        : Sep. 5, 1989

INVENTOR(S)  : Jay S. Derman

It is certified that error appears in the above—identified patent and that said Letters Patent is hereby corrected as shown below:

On Page 1 in the Title, line 1 of the Patent, change "NOT" to -- NUT --.

Signed and Sealed this

Third Day of April, 1990

Attest:

HARRY F. MANBECK, JR.

Attesting Officer

Commissioner of Patents and Trademarks